US011956138B1

(12) United States Patent
Ba et al.

(10) Patent No.: US 11,956,138 B1
(45) Date of Patent: Apr. 9, 2024

(54) AUTOMATED DETECTION OF NETWORK ANOMALIES AND GENERATION OF OPTIMIZED ANOMALY-ALLEVIATING INCENTIVES

(71) Applicant: International Business Machines Corporation, Armonk, NY (US)

(72) Inventors: Amadou Ba, Navan (IE); Fearghal O'Donncha, Aran Islands (IE); Albert Akhriev, Dublin (IE); Paulito Palmes, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/139,591

(22) Filed: Apr. 26, 2023

(51) Int. Cl.
*G06F 15/173* (2006.01)
*H04L 41/16* (2022.01)
*H04L 43/065* (2022.01)
*H04L 43/16* (2022.01)

(52) U.S. Cl.
CPC .............. *H04L 43/16* (2013.01); *H04L 41/16* (2013.01); *H04L 43/065* (2013.01)

(58) Field of Classification Search
CPC ........ H04L 43/16; H04L 41/16; H04L 43/065
See application file for complete search history.

(56) References Cited

U.S. PATENT DOCUMENTS

| | | | |
|---|---|---|---|
| 7,233,843 B2 | 6/2007 | Budhraja et al. | |
| 8,078,330 B2 | 12/2011 | Brickfield et al. | |
| 8,751,421 B2 | 6/2014 | Anderson et al. | |

(Continued)

FOREIGN PATENT DOCUMENTS

| | | |
|---|---|---|
| CN | 113988508 A | 1/2022 |
| IN | 202221051815 A | 9/2022 |
| WO | 2020000399 A1 | 1/2020 |

OTHER PUBLICATIONS

Nandanoori et al., Graph Neural Network and Koopman Models for Learning Networked Dynamics: A Comparative Study on Power Grid Transients Prediction, Feb. 16, 2022.

(Continued)

*Primary Examiner* — Padma Mundur
(74) *Attorney, Agent, or Firm* — Garg Law Firm, PLLC; Rakesh Garg; Nicholas Welling

(57) ABSTRACT

An embodiment establishes a knowledge base based at least in part on sensor data received from a network. The embodiment generates a predicted performance parameter for a designated entity of the network using a first machine learning algorithm. The embodiment compares the predicted performance parameter to an actual performance parameter and determines whether the actual performance parameter exceeds a threshold difference from the predicted performance parameter. The embodiment generates, responsive to determining that the threshold difference is exceeded, incentive data using a second machine learning algorithm, where the incentive data is representative of an action selected by the second machine learning algorithm using an iterative optimization process, and where the iterative optimization process comprises performing the action and determining that the actual performance parameter approaches the threshold value in response to the action.

13 Claims, 10 Drawing Sheets

(56) References Cited

U.S. PATENT DOCUMENTS

| | | | |
|---|---|---|---|
| 2006/0242288 A1 | 10/2006 | Masurkar | |
| 2008/0177423 A1* | 7/2008 | Brickfield | H02J 3/003 700/291 |
| 2022/0101103 A1* | 3/2022 | Fatemi | G06N 3/088 |
| 2022/0247618 A1* | 8/2022 | Côté | H04L 41/16 |

OTHER PUBLICATIONS

Ringsquandl et al., Power to the Relational Inductive Bias: Graph Neural Networks in Electrical Power Grids, CIKM '21: Proceedings of the 30th ACM International Conference on Information & Knowledge Management, Sep. 8, 2021.

Karimi et al., Spatiotemporal Graph Neural Network for Performance Prediction of Photovoltaic Power Systems, The Thirty-Fifth AAAI Conference on Artificial Intelligence (AAAI-21), vol. 35, No. 17, May 18, 2021.

* cited by examiner

US 11,956,138 B1

AUTOMATED DETECTION OF NETWORK ANOMALIES AND GENERATION OF OPTIMIZED ANOMALY-ALLEVIATING INCENTIVES

BACKGROUND

The present invention relates generally to network management. More particularly, the present invention relates to a method, system, and computer program for automated detection of network anomalies and generation of optimized anomaly-alleviating incentives.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)— also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

SUMMARY

The illustrative embodiments provide for automated detection of network anomalies and generation of optimized anomaly-alleviating incentives. An embodiment includes establishing a knowledge base based at least in part on sensor data received from a network, wherein the knowledge base comprises network data representative of a plurality of entities in the network and relationships among the plurality of entities in the network. The embodiment also includes generating a predicted performance parameter for a designated entity from the plurality of entities using a first machine learning algorithm. The embodiment also includes comparing the predicted performance parameter to an actual performance parameter. The embodiment also includes determining that the actual performance parameter exceeds a threshold difference from the predicted performance parameter. The embodiment also includes generating, responsive to determining that the actual performance parameter exceeds the threshold value, incentive data using a second machine learning algorithm. The embodiment also includes that the incentive data is representative of an action selected by the second machine learning algorithm using an iterative optimization process, and that the iterative optimization process comprises performing the action and determining that the actual performance parameter approaches the threshold value in response to the action. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
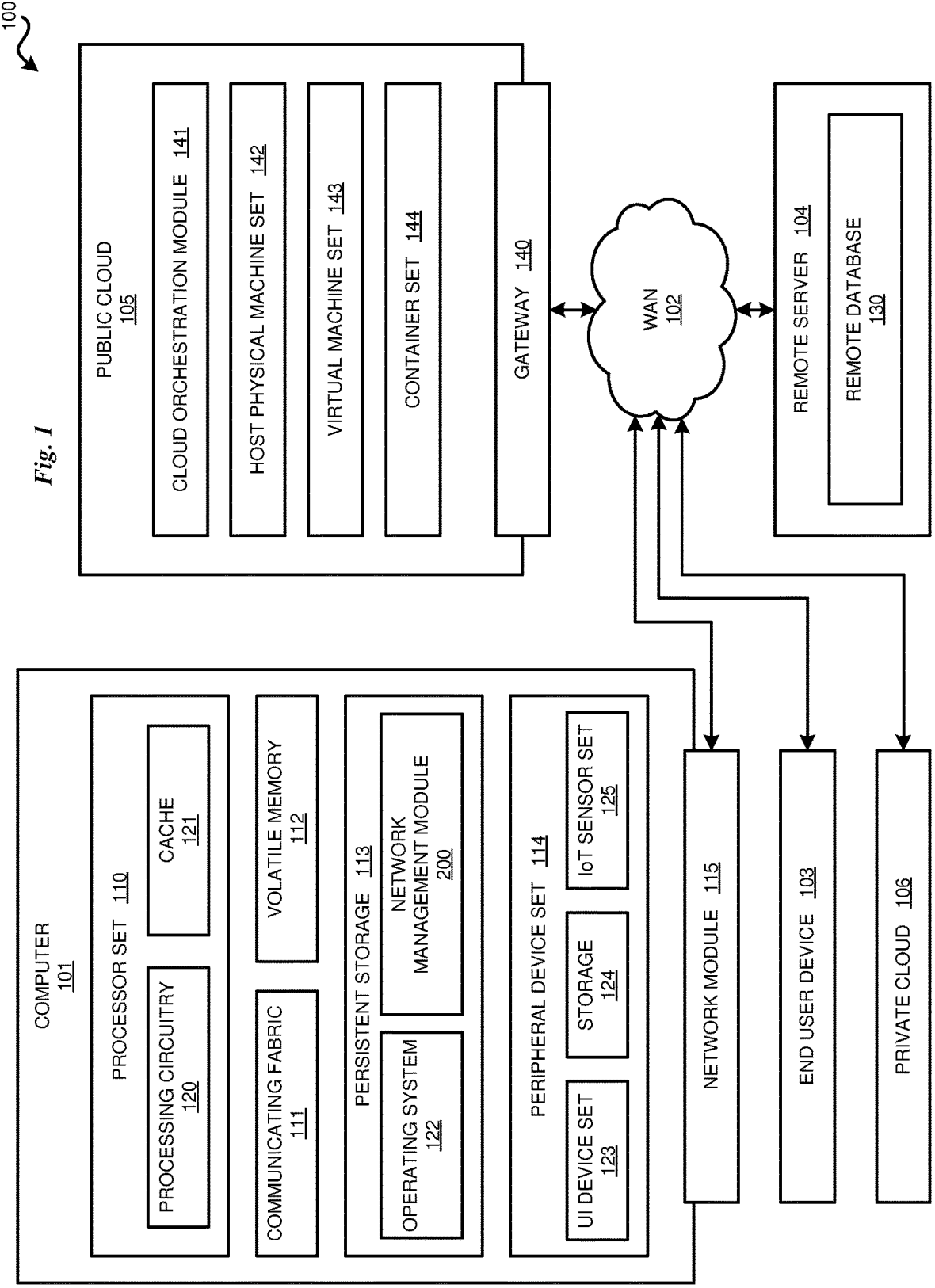
FIG. 1 depicts a block diagram of a computing environment in accordance with an illustrative embodiment.

Electric power generation has traditionally been performed by large-scale centralized facilities that are powered by fossil fuels or nuclear power or hydropower. These systems were monolithic and unidirectional systems. Smart grid technology has evolved to allow multidirectional communications and transmission of power. The smart grid increases the connectivity between power generation companies and power distributors.

The smart grid also provides digital two-way communications with end users. For example, consumers can have smart meters installed at their premises that can report energy usages patterns to the utility for monitoring and billing purposes. Consumers may also have smart devices installed in their homes that can receive information from energy providers over the smart grid that inform the devices when demand for electricity is high causing the cost of electricity to rise.

However, despite this improved communication capability, the information being communicated to consumers is often ineffective for motivating consumers to make changes that would result in a reduction in demand for electricity. Reasons for this ineffectiveness stem from the lack of information available to energy providers that would allow for better targetted and more influential communications with end users.

Currently there is no way to simultaneously monitor power grids and their ecosystem in an integrated manner for operational performance and the monitoring of carbon footprint degradation. There is also currently no holistic system that considers people, systems, ecosystems, grids and so on, and provides a representation model. These current limitations make it impossible to provide efficient, cost-effective and self-aware services, pertaining specifically to sustainability, to end users. As a result, current efforts in this regard are inefficient and ineffective due to the current inability to determine where significant degradations are occurring in the power network.

The present disclosure addresses the deficiencies described above by providing a process (as well as a system, method, machine-readable medium, etc.) that develops a dual system that considers a knowledge graph (grids, people, behavior) and a reinforcement learning model and leverages recent advances in Graph Neural Networks (GNN) to learn the representation of the knowledge graph. Disclosed embodiments combine GNN techniques with reinforcement learning to determine optimal messaging and recipient groups for achieving energy demand reduction goals.

The illustrative embodiments provide for automated detection of network anomalies and generation of optimized anomaly-alleviating incentives. An anomaly as referred to herein is an indication of an undesirably high demand such that the demand exceeds an expected or predicted level of demand by some threshold margin. Embodiments disclosed herein describe the network as an electrical power network; however, use of this example is not intended to be limiting, but is instead used for descriptive purposes only. Instead, the network can include elements of one or more of an electrical power network, a water treatment/supply network, a transportation network, a fuel supply network, a communications network, as well as others.

Also, an incentive as referred to herein may or may not include something of value. For example, an incentive may include something of monetary value such as a discount, gift, or prize. An incentive may also be something lacking monetary value, such as an encouraging or inspirational message.

Illustrative embodiments include establishing a knowledge base based at least in part on sensor data received from a network. The knowledge base comprises network data representative of a plurality of entities in the network and relationships among the plurality of entities in the network. An entity as referred to herein is any network component of interest represented as a node in the knowledge graph and will generally be a source of data or described by another source of data.

Illustrative embodiments include generating a predicted performance parameter for a designated entity from the plurality of entities using a first machine learning algorithm. In some embodiments, the first machine learning algorithm is a graph neural network. The graph neural network (GNN) is applicable mainly to non-Euclidean spatial data. Because the knowledge graph is a kind of graph data, the preset disclosure recognizes that a combination of the GNN and the knowledge graph can be used to solve knowledge graph-related problems. For example, the GNN-based approach can adequately capture information on complex and hidden patterns in ternary neighborhoods. It can also achieve the relational complementation of the knowledge graph, in contrast with knowledge-based reasoning that uses individual ternary relationships.

Illustrative embodiments also include comparing predicted performance parameter to an actual performance parameter for all or a portion of the network. Such embodiments may also determine that the actual performance parameter exceeds a threshold difference from the predicted performance parameter. The threshold difference may be adjustable as a user setting, for example depending on the application and desired level of detail and precision.

Illustrative embodiments respond to determining that the actual performance parameter exceeds the threshold value by generating incentive data using a second machine learning algorithm. In some embodiments, the second machine learning algorithm is a reinforcement learning algorithm. In some such embodiments, the incentive data is representative of an action selected by the second machine learning algorithm using an iterative optimization process, and the iterative optimization process comprises performing the action and determining that the actual performance parameter approaches the threshold value in response to the action. The embodiment also includes that the incentive data is representative of an action selected by the second machine learning algorithm using an iterative optimization process, and that the iterative optimization process comprises performing the action and determining that the actual performance parameter approaches the threshold value in response to the action.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved network management module 200 that provides insights into a network's performance and characteristics of network usage, and provides incentives to network users for reducing or avoiding excessive network usage. In addition to network management module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and network management module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in network management module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in network management module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
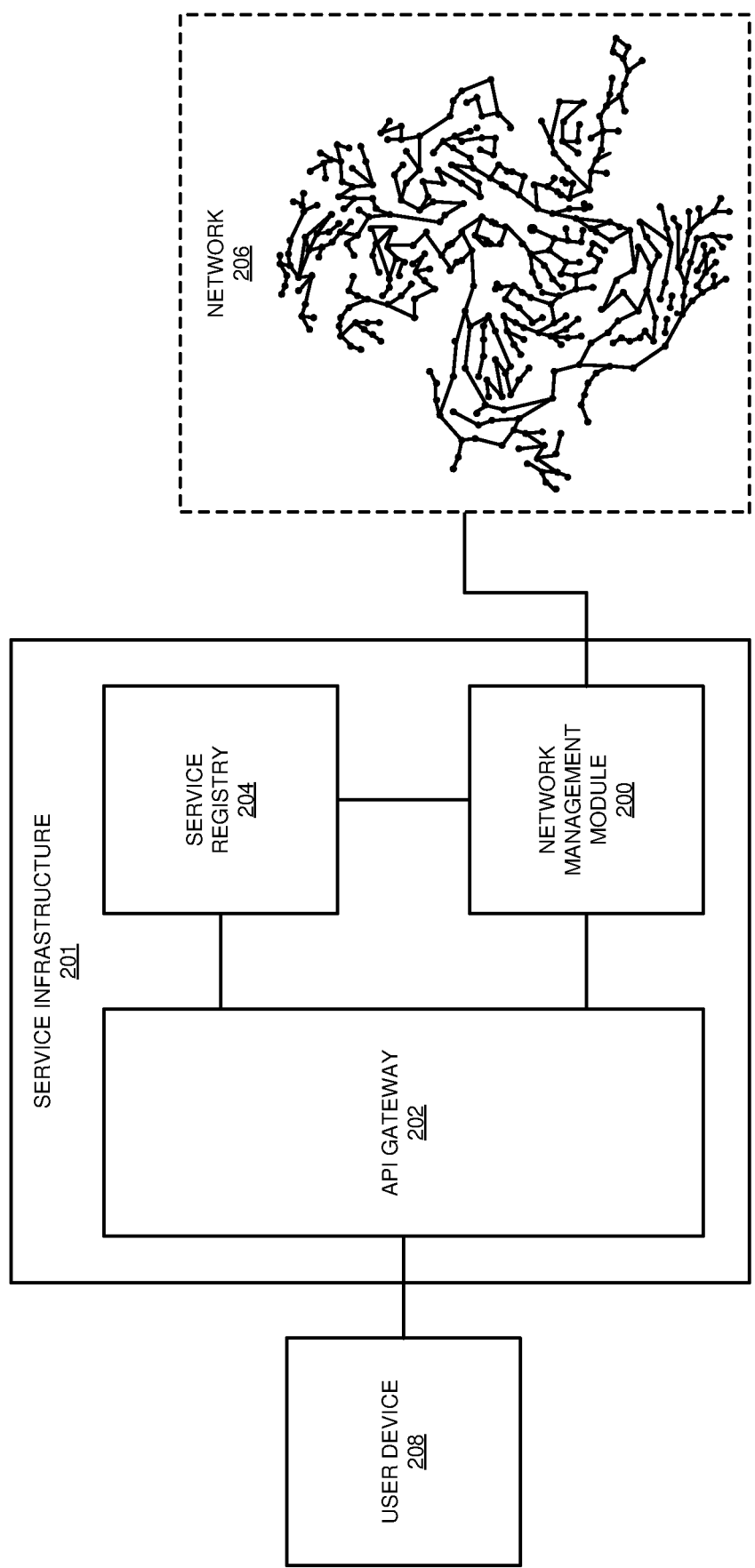
FIG. 2 depicts a block diagram of an example service infrastructure in accordance with an illustrative embodiment.

With reference to FIG. 2, this figure depicts a block diagram of an example service infrastructure 201 in accordance with an illustrative embodiment. In the illustrated embodiment, the service infrastructure 201 includes the network management module 200 of FIG. 1.

In the illustrated embodiment, the service infrastructure 201 provides services and service instances to a user device 208. User device 208 communicates with service infrastructure 201 via an API gateway 202. In various embodiments, service infrastructure 201 and its associated network management module 200 serve multiple users and multiple tenants. A tenant is a group of users (e.g., a company) who share a common access with specific privileges to the software instance. Service infrastructure 201 ensures that tenant specific data is isolated from other tenants.

In the illustrated embodiment, service infrastructure 201 includes a service registry 204. In some embodiments, the network management module 200 is hosted on a virtual machine and the service registry 204 looks up service instances for network management module 200 in response to a service lookup request such as one from API gateway 202 in response to a service request from user device 208. For example, in some embodiments, the service registry 204 looks up service instances of network management module 200 in response to requests related to incident resolution from the user device 208.

As described herein, the network management module 200 may provide an intelligent incident resolution recommendation system that manifests in the form of an Internet website or a mobile application that is accessible by user device 208. A backend administration system 206 allows users with administrative privileges to perform various administrative tasks associated with the network management module 200 as described herein, such as initiating a data collection and/or correlation process or a neural network training process.

In some embodiments, service registry 204 maintains information about the status or health of each service instance including performance information associated each of the service instances. In some such embodiments, such information may include various types of performance characteristics of a given service instance (e.g., cache metrics, etc.) and records of updates.

In some embodiments, user device 208 connects with API gateway 202 via any suitable network or combination of networks such as the Internet, etc. and uses any suitable communication protocols such as Wi-Fi, Bluetooth, etc. Service infrastructure 201 may be built on the basis of cloud computing. API gateway 202 provides access to client applications like the network management module 200. API gateway 202 receives service requests issued by client applications and creates service lookup requests based on service requests. As a non-limiting example, in an embodiment, the user device 208 executes a routine to initiate interaction with the network management module 200. For instance, in some embodiments, the user device 208 executes a routine to instruct the network management module 200 monitor network 206 according to embodiments described herein.

Figure 3:
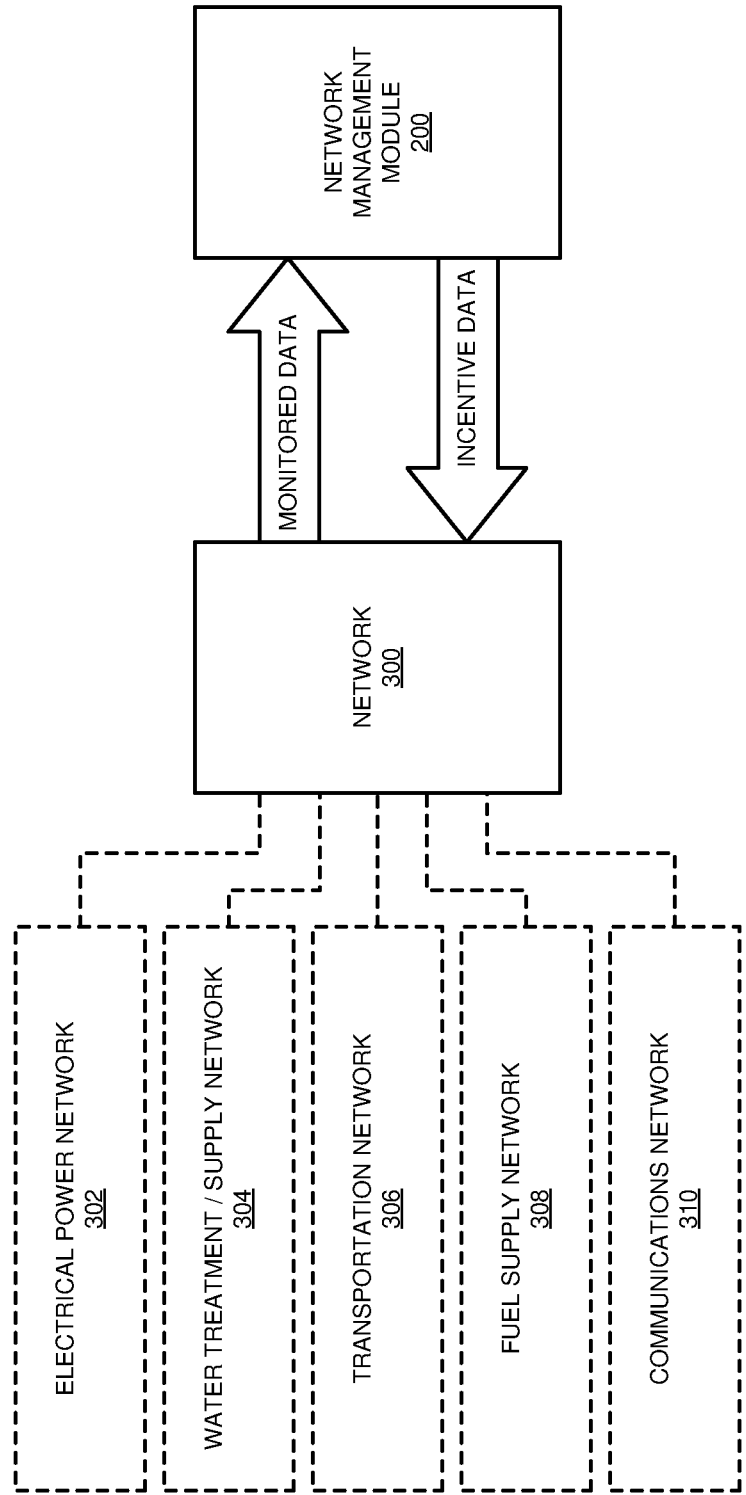
FIG. 3 depicts a block diagram of an exemplary processing environment of a network management module in accordance with an illustrative embodiment.

With reference to FIG. 3, this figure depicts a block diagram of an exemplary processing environment of a network management module 200 in accordance with an illustrative embodiment. In the illustrated embodiment, the network 300 is an example of the network 206 of FIG. 2.

In the illustrated embodiment, the network management module 200 receives monitored data from a network 300 and provides incentive data to the network 300. The network management module 200 evaluates the monitored data for anomalies and generates the incentive data in response to detected anomalies using techniques described herein. Embodiments of the network 300 include one or more of a variety of different types of networks having varying degrees of complexity. For example, as shown in FIG. 3, the network 300 can include elements of one or more of an electrical power network 302, a water treatment/supply network 304, a transportation network transportation network 306, a fuel supply network 308, and a communications network 310. Embodiments disclosed herein described the network 300 within the context of an electrical power network 302; however, this is for descriptive purposes only and is not intended to be limiting.

Figure 4:
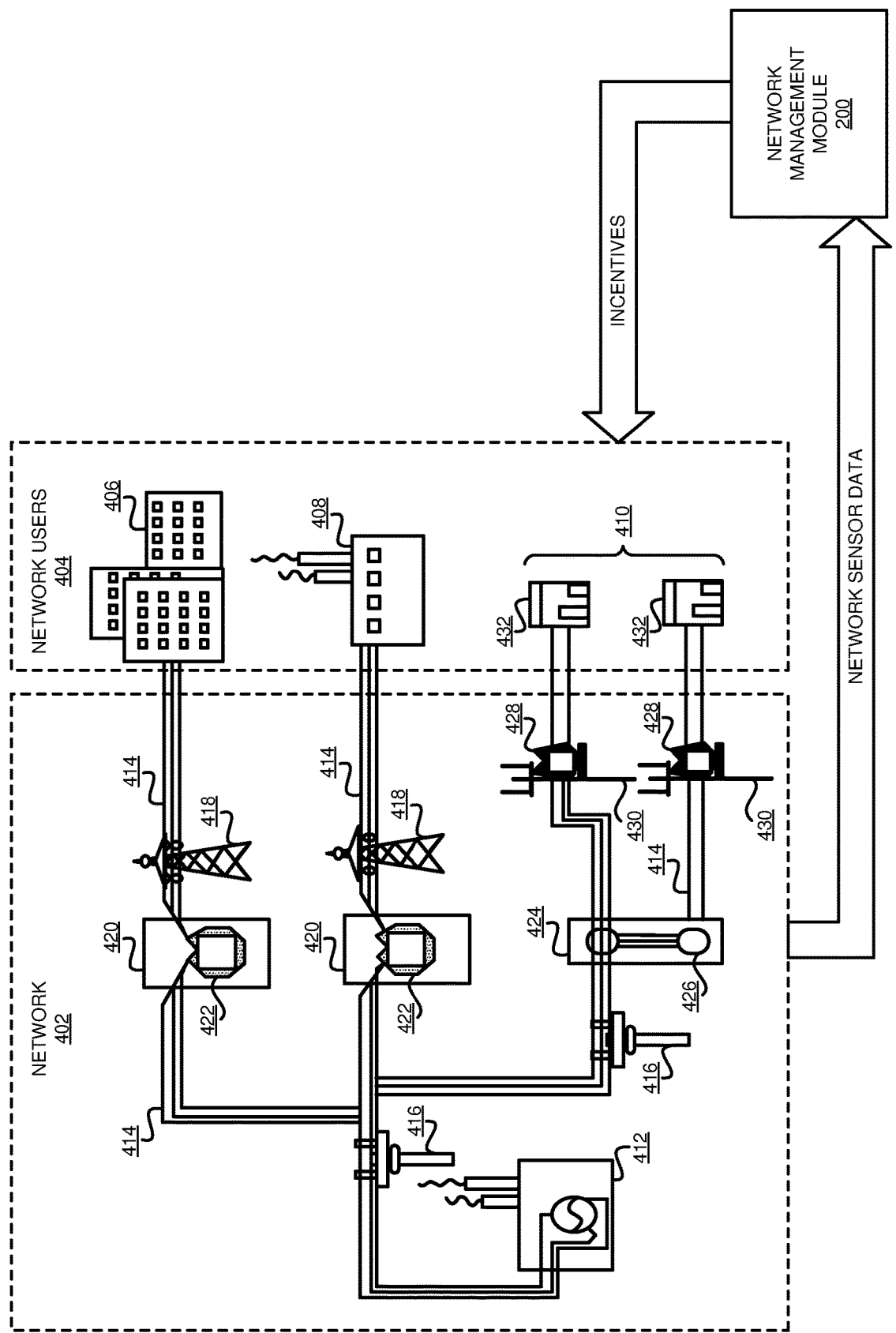
FIG. 4 depicts a block diagram of an exemplary processing environment of a network management module in accordance with an illustrative embodiment.

With reference to FIG. 4, this figure depicts a block diagram of an exemplary processing environment of a network management module 200 in accordance with an illustrative embodiment. In the illustrated embodiment, the network 402 is an example of the network 206 of FIG. 2 and the electrical power network 302 of FIG. 3.

In the illustrated embodiment, the network management module 200 receives network sensor data from the electrical power network 402 and analyzes the network sensor data for anomalies. In the illustrated embodiment, the electrical power network 402 generates, transmits, and distributes electrical energy to loads, which include network users 404. The electrical power network 402 is shown as a non-limiting example. Alternative embodiments can include generating stations that produce electrical power; electrical substations for stepping electrical voltage up for transmission, or down for distribution; high voltage transmission lines that carry power from distant sources to demand-centers; and distribution lines that connect individual customers.

As illustrated, the electrical power network 402 includes electric power generating station 412. The electric power transmission and distribution lines 414, poles 416, and towers 418 deliver power to business entities 406 and industrial entities 408 via secondary distribution stations 420 that include a distribution transformers 422. Power is also delivered to residential entities 432 of a residential neighborhood 410 through a secondary distribution station 424, which includes circuit breakers 426 to control the flow of power in the system. From the circuit breakers 426, power flows to the residential entities 432 through pole-mounted distribution transformers 428 on poles 430. In the illustrated embodiment, the electric power generating station 412, distribution lines 414, poles 416, towers 418, distribution stations 420, distribution transformers 422, distribution stations 424, circuit breakers 426, pole-mounted distribution transformers 428, and poles 430 are examples of network entities. Although not shown, any one or more of the network entities (the electric power generating station 412, distribution lines 414, poles 416, towers 418, distribution stations 420, distribution transformers 422, distribution stations 424, circuit breakers 426, pole-mounted distribution transformers 428, and poles 430) include sensors that provide time-series sensor data to the network management module 200 transformer monitoring module. The sensor data is representative of various parameters of the respective network entities. The sensors may include, as non-limiting examples, current sensors, voltage sensors, temperature sensors, vibration sensors, oil level sensors, and humidity sensors.

In some embodiments, the network management module 200 detects anomalies by comparing an actual parameter value in the network sensor data to an expected parameter value. The network management module 200 determines whether the actual parameter value exceeds a threshold value. If so, then the network management module 200 generates incentive data representative of an action selected using an iterative optimization process described herein.

In the illustrative embodiment, the incentive data is representative of one or more incentives provided to one or more network users 404. For example, the incentive data may include an email message, text message, or other message or image data that conveys an incentive to the one or more network users 404. An incentive as referred to herein may or may not include something of value. For example, an incentive may include something of monetary value such as a discount, gift, or prize, or something lacking monetary value, such as an encouraging or inspirational message.

In some embodiments, the network includes clusters of one or more of the network users 404. For example, in the illustrated embodiment, the residential neighborhood 410 includes a plurality of residential users 432. In some embodiments, a group of entities of the network 402 that are involved in provide electrical power to the neighborhood 410 can be considered an example of a subnetwork. In some embodiments, the network management module 200 evaluates the network 402 by evaluating individual subnetworks for anomalies and providing incentives only to users of subnetworks where anomalies are found.

Figure 5:
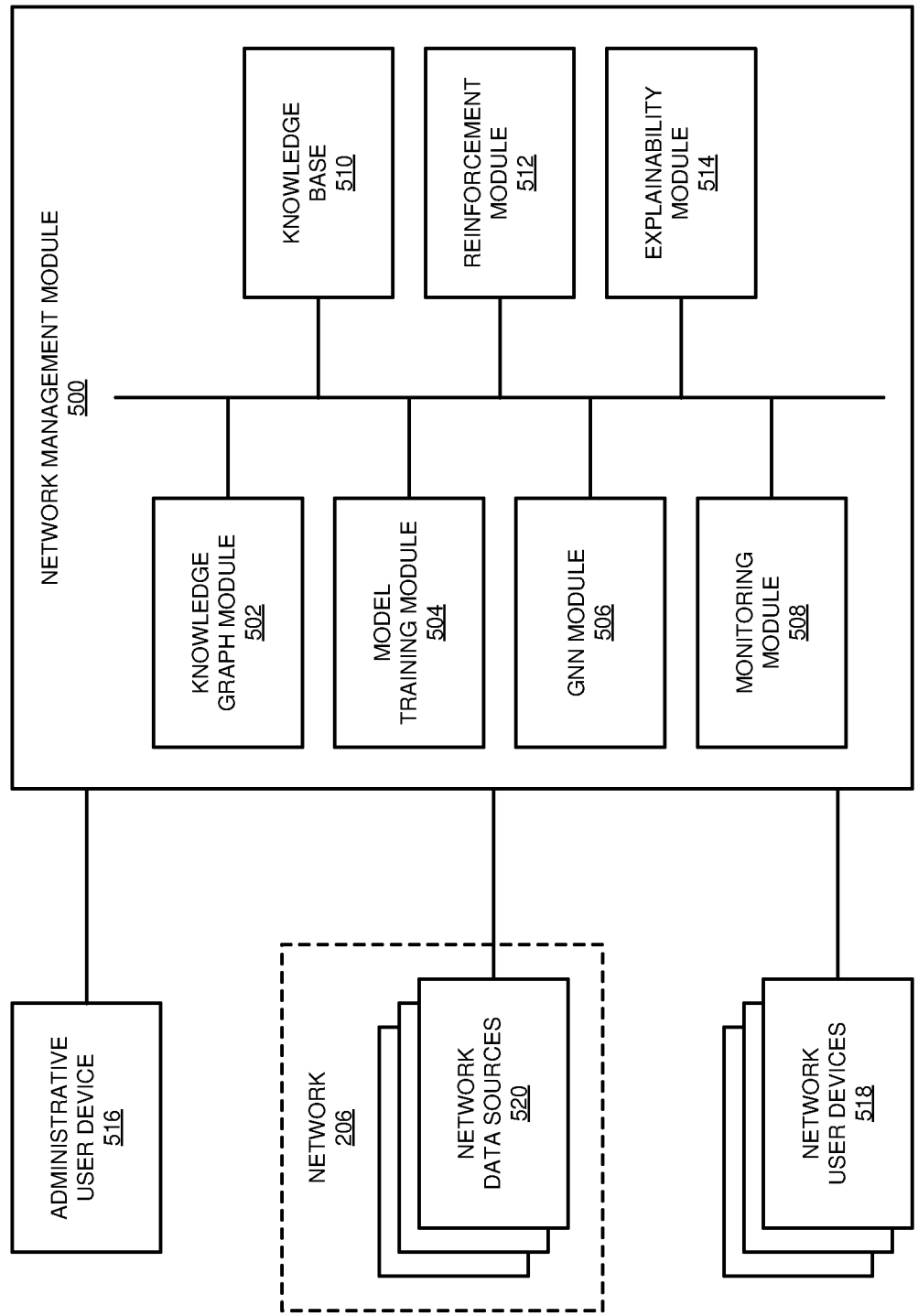
FIG. 5 depicts a block diagram of an exemplary network management module in accordance with an illustrative embodiment.

With reference to FIG. 5, this figure depicts a block diagram of an exemplary network management module 500 in accordance with an illustrative embodiment. In the illustrated embodiment, the network management module 500 is an example of the network management module 200 of FIGS. 1-4.

In the illustrated embodiment, the network management module 500 includes a knowledge graph module 502, a module model training module 504, a GNN module 506, a monitoring module 508, a knowledge base 510, a reinforcement module 512, and an explainability module 514. In alternative embodiments, the network management module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, an administrative user device 516 allows users with administrative privileges to perform various administrative tasks associated with the network management module 200 as described herein. For example, in some embodiments, the administrative user device 516 allows an administrative user to initiate a data collection process or network monitoring process. As another example, in some embodiments, the administrative user device 516 allows a user with administrative privileges to initiate and monitor the training process performed by the model training module 504, including setting desired hyperparameters for the training process.

In the illustrated embodiment, the network management module 500 is also in communication with a network 206.

Network 206 includes a plurality of network data sources 520. The network data sources 520 can include any known types of network monitoring systems or sensors that generate network monitoring data. The exact devices used to generate network monitoring data may be implementation-specific and dependent upon the type of network.

The network management Module 500 is also in communication with a plurality of network user devices 518, which may be any type of computing devices. In an exemplary embodiment, the network users 404 of FIG. 4 are examples of users associated with network user devices 518.

In some embodiments, the network management module 500 receives network monitoring data from the network data sources 520 and evaluates the received network monitoring data for anomalies. Then, responsive to detecting anomalies, the network management 500 generates incentive data representative of incentives provided to network user devices network user devices 518.

In some embodiments, the knowledge graph module 502 receives the network monitoring data from network data sources 520 and generates a knowledge graph representative of the network 206. For example, in some embodiments, the knowledge graph module 502 mines possible connections between entities and generates graph structure data representative of the topological structure of the power grid of the network 206. In some embodiments, the resulting knowledge graph can indicate relationships between entities in the network 206.

The knowledge graph includes a plurality of nodes representative of entities of the network 206 and includes a plurality of edges connecting pairs of nodes representative of relationships between entities of the network 206. The entities of the network 206 will depend on the type of network and may be implementation specific.

The model training module 504 trains a graph neural network (GNN) for use with the GNN module 506. In some embodiments, the model training module 504 trains the GNN using supervised or unsupervised neural network training techniques. For example, in some embodiments, the model training module 504 trains the GNN using a representation learning technique.

In some embodiments, the knowledge graph generated by the knowledge graph module 502 represents a power grid of the network 206. In some such embodiments, the network management module 500 generates the GNN as a model of the network 206 based on the knowledge graph representation of the network 206.

In some embodiments, the knowledge base 510 receives and stores metadata and other data representative of various aspects of the network 206. In some embodiments, inputs to the knowledge base 510 include a features vector of the entity to model, the features of its edges, the state of the neighborhood, features of the entities in the neighborhood, and user behaviors. In some embodiments, the knowledge base 510 includes data indicative of designated portions or subnetworks of the network 206. For example, in some embodiments, the network 206 is a power distribution network that covers a citywide or metropolitan wide area and sub networks of the network 206 include respective portions of the network 206 that cover different neighborhoods within the city or metropolitan area, such as residential neighborhood 410 of FIG. 4.

In some such embodiments, the knowledge base 510 provides a subnetwork of the network 206 to the GNN module 506, which in turn generates a prediction of one or more network performance parameters of that subnetwork of the network 206. In some such embodiments, the monitoring module 508 then receives actual monitored data from the knowledge base 510 that is received from network data sources 520 and compares it to predicted data from the GNN module 506. In some such embodiments, the monitoring module 508 determines whether an anomaly is present based on this comparison.

In some embodiments, when the monitoring module 508 detects an anomaly, it notifies the reinforcement module 512. In some such embodiments, the reinforcement module 512 then performs an optimization process to determine an optimum incentive program to incentivize users to adjust various user activities so as to allow the subnetwork associated with such users to achieve a level of performance that is more in line with a desired performance level for that sub network.

For example, suppose a particular sub network of a power supply network provides monitoring data that is indicative of the associated neighborhood using higher than expected levels of electricity. The monitoring module 508 detects this excessive use as an anomaly and notifies the reinforcement module 512. In response, the reinforcement module 512 attempts to determine an optimal incentive program to incentivize users of the sub network (i.e., users in the associated neighborhood) to reduce their electrical power usage so that this sub network will see a reduced level of power usage and approach a reduced level of power usage that is more in line with what is desirable for the particular neighborhood. In some such embodiments, the reinforcement module 512 may attempt a plurality of different incentives using an iterative process in which the reinforcement module 512 offers an incentive, then determines how the incentive affects the performance of the associated sub network; if the incentive does not result in the desired effect, then the iterative process will continue to try alternative incentives until an optimal incentive is determined that either achieves the desired performance of this sub network or is determined to be an incentive that gets closest to the desired level of performance for the sub network.

The explainability module 514 allows users to understand predictions made by the GNN of the GNN module 506. The explainability module 514 performs one or more of several known techniques that explain predictions made by GNNs, including gradient-based: Grad, GradCAM, GuidedBP, Integrated Gradients; perturbation-based: GNNExplainer, PGExplainer, SubgraphX; and surrogate-based techniques: PGMExplainer.

Figure 6:
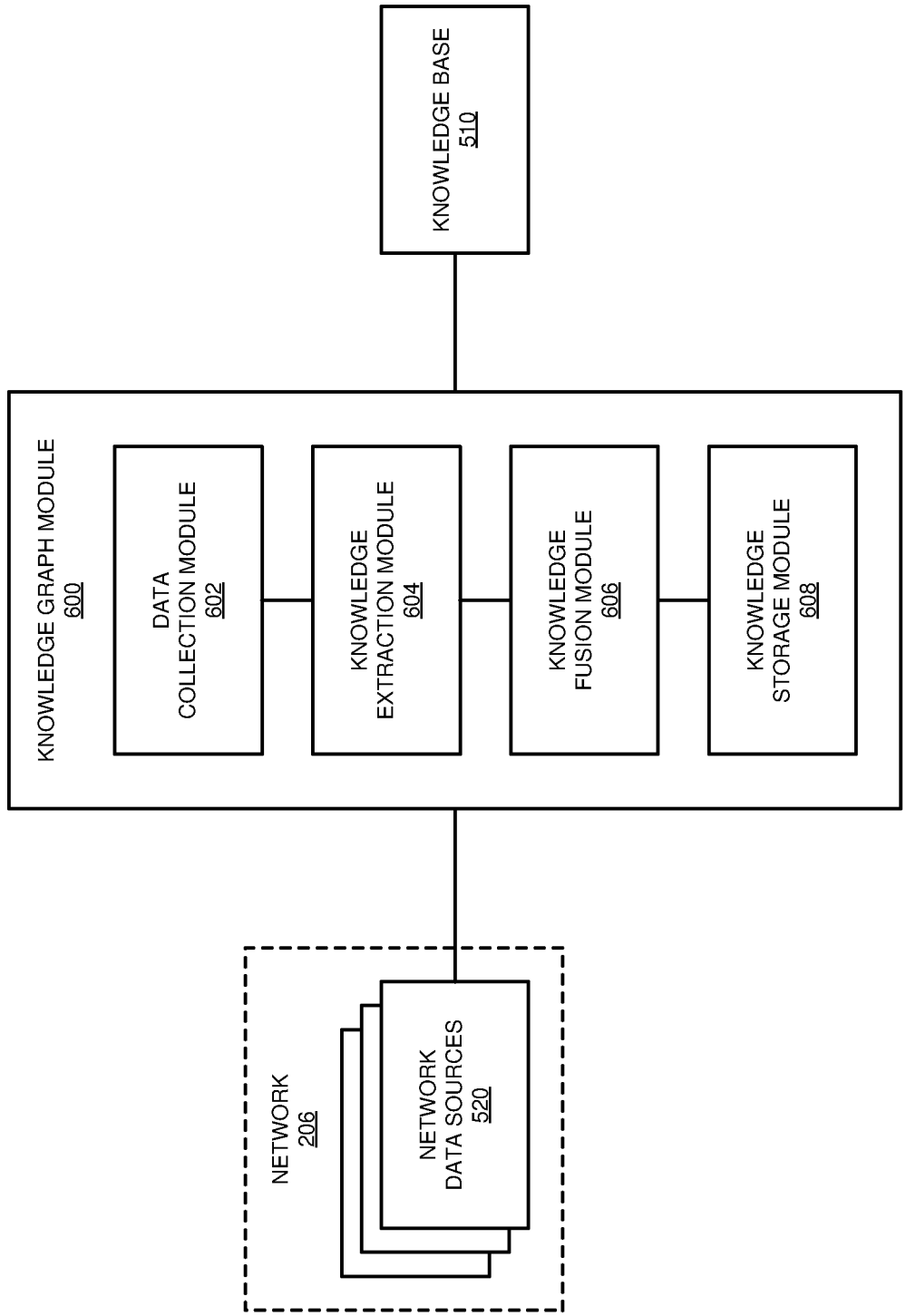
FIG. 6 depicts a block diagram of an exemplary knowledge graph module in accordance with an illustrative embodiment.

With reference to FIG. 6, this figure depicts a block diagram of an exemplary knowledge graph module 600 in accordance with an illustrative embodiment. In the illustrated embodiment, the knowledge graph module 600 is an example of the knowledge graph module 502 of FIG. 5.

In the illustrated embodiment, the knowledge graph module 600 includes a data collection module 602, a knowledge extraction module 604, a knowledge fusion module 606, and a knowledge storage module 608. The knowledge graph module 600 is in communication with the network 206 and receives monitored data from network data sources 520. In alternative embodiments, the knowledge graph module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, data collection module 602 receives monitored data from network data sources 520 of the network 206. In some embodiments, the monitored data from network data sources 520 comes from multiple dimensions and types of data, which can include data collected from monitoring systems, including environment data, device operation data, and inspection data. The monitored data from network data sources 520 can also include data collected from discrete collection and history data.

In the illustrated embodiment, the knowledge extraction module 604 extracts knowledge from collected monitored data from the network data sources 520. In some embodiments, the monitored data may include structured data, semi-structured data, and/or unstructured data. The knowledge fusion module 606 further integrates these various types of complex data to expand the knowledge graph. In some embodiments, the knowledge fusion module 606 uses known fusion methods, for example string-based matching techniques and divide-and-conquer algorithms, to integrate such multi-source heterogeneous data in the knowledge graph and knowledge base 510. In some embodiments, the knowledge fusion module 606 also uses entity relationship analysis, synonym construction, semantic analysis, keyword extraction, and other technologies to further integrate the complex knowledge acquired from multi-source data to expand the knowledge graph and knowledge base 510.

In the illustrated embodiment, the knowledge storage module 608 provides stores the processed data from the knowledge fusion module 606 and stores it in the knowledge base knowledge base 510. In this way, the knowledge storage module 608 provides storage, query, analysis and mining platform services for the monitoring data received from the network 206.

Figure 7:
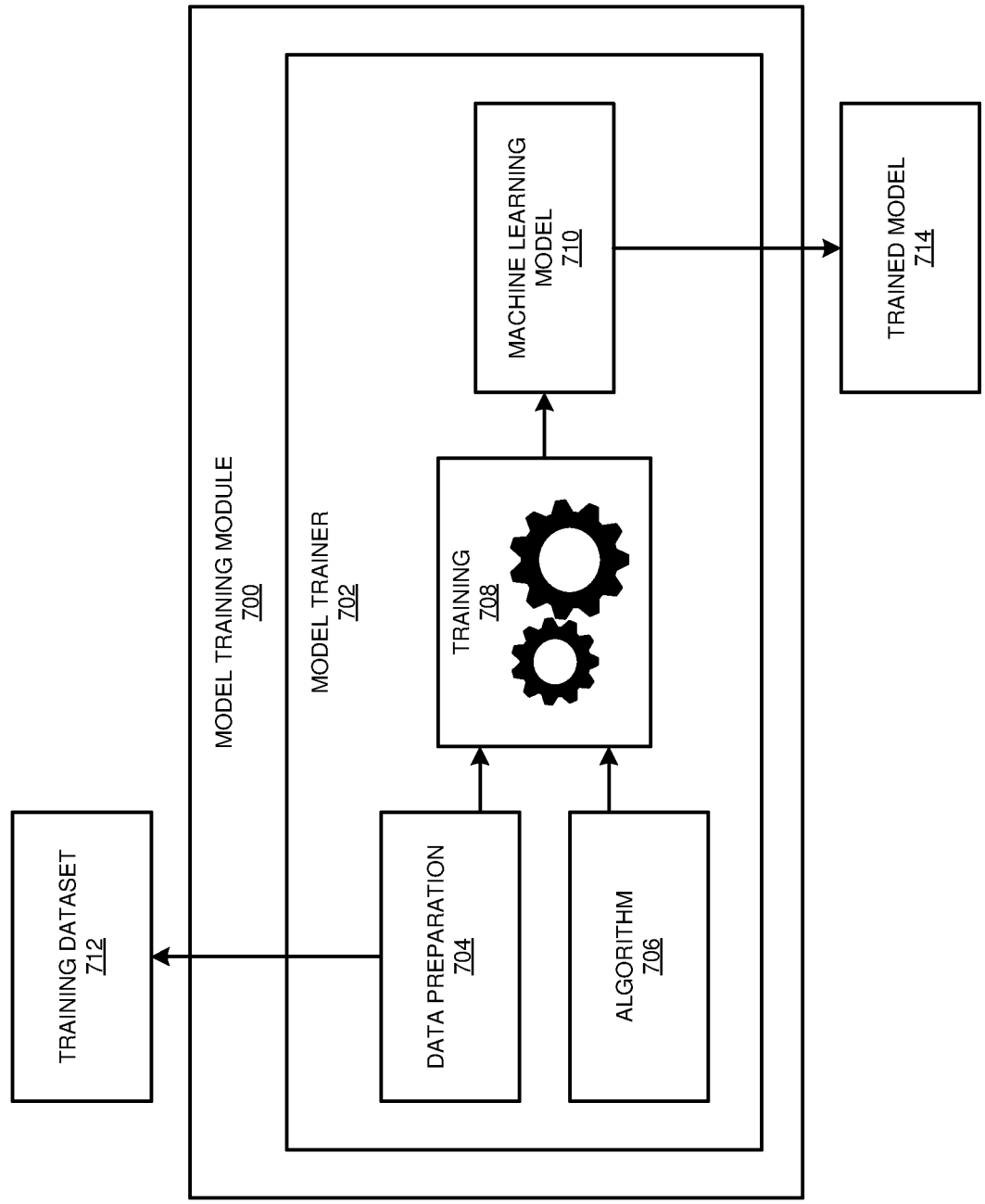
FIG. 7 depicts a block diagram of an exemplary model training module in accordance with an illustrative embodiment.

With reference to FIG. 7, this figure depicts a block diagram of an exemplary model training module 700 in accordance with an illustrative embodiment. In the illustrated embodiment, the model training module 700 is an example of the model training module 504 of FIG. 5.

In the illustrated embodiment, model training module 700 includes a model trainer 702. The model trainer 702 includes a data preparation module 704, algorithm module 706, training engine 708, and machine learning model 710. In alternative embodiments, the model training module 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the model trainer 702 generates a machine learning model 710 based on an algorithm provided by algorithm module 706. In an embodiment, the algorithm module 706 selects the algorithm based on one or more known machine learning algorithms. In an embodiment, model trainer 702 includes a training engine 708 that trains the machine learning model 710 using the training dataset 712. In some embodiments, the training dataset 712 includes historical network performance data as ground truth data for training a GNN to predict anomalies based on network parameters.

In some embodiments, the training dataset 310 is preprocessed by a data preparation module 704 for the model trainer 702. In some such embodiments, the data preparation module 704 structures the data to make best use of the machine learning model 710. Embodiments of the data preparation module 704 use one or more of the following heuristics:

Linear data transformation: transform the data to make the relationship linear (e.g., log transform for an exponential relationship);

Noise reduction: use data cleaning operations that better expose and clarify the signal in the data, e.g., remove outliers in the output variable (y) where possible;

Collinearity reduction: calculate pairwise correlations for the input data and remove the most correlated to prevent over-fitting of the data due to highly correlated input variables;

Gaussian distribution: transform the input data (e.g., logarithmic or Box-Cox transformation) so that input and output variables have a Gaussian distribution; and Rescale Inputs: scale data using normalization (e.g., rescale data so that values are within a range of 0 and 1) or standardization (e.g., rescale data so that the mean of observed values is 0 and the standard deviation is 1).

In an embodiment, the training engine 708 trains the machine learning model 710 using the training dataset 712, resulting in the trained machine learning model 714. In some embodiments, the training dataset 712 is divided into two discrete subsets, where one subset is used by the training engine 708 for initially training the machine learning model 710. The other subset is used by the training engine 708 to test the trained model 714 and determine the accuracy of the trained model 714.

Figure 8:
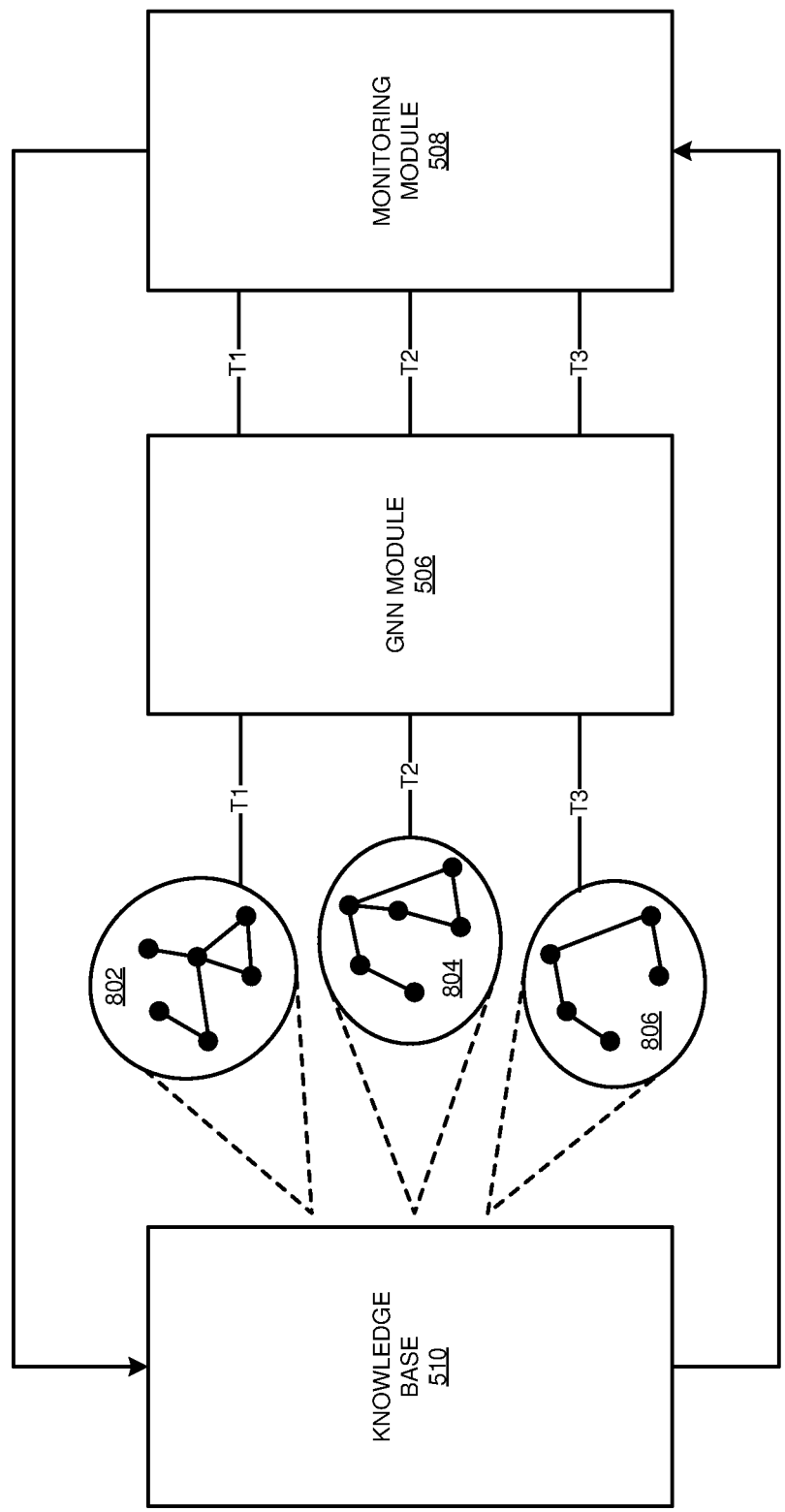
FIG. 8 depicts a block diagram of an exemplary monitoring process in accordance with an illustrative embodiment.

With reference to FIG. 8, this figure depicts a block diagram of an exemplary monitoring process in accordance with an illustrative embodiment. In the illustrated embodiment, the knowledge base 510 stores metadata and other data representative of aspects of the network 206 of FIG. 2. In some embodiments, the knowledge base 510 includes subgraph data indicative of respective portions of the network 206. For example, in some embodiments, the network 206 is a power distribution network that includes three subnetworks that cover respective regions (e.g., neighborhoods, districts, etc.), and the knowledge base 510 includes subgraphs 802, 804, and 806, which correspond with respective subnetworks.

In the illustrated embodiment, the knowledge base 510 provides data for a first subnetwork 802 during a first window of time T1 to the GNN module 506. The GNN module 506 generates a prediction of one or more network performance parameters of the first subnetwork 802 and provides the prediction to the monitoring module 508. In some such embodiments, the monitoring module 508 then receives actual monitored data from the knowledge base 510 for the first subnetwork 802 and compares it to predicted data from the GNN module 506. In some such embodiments, the monitoring module 508 determines whether an anomaly is present based on this comparison. In some embodiments, if the monitoring module 508 detects an anomaly, the monitoring module 508 notifies the reinforcement module 512 (shown in FIG. 5).

In the illustrated embodiment, the knowledge base 510 provides data for a second subnetwork 804 during a second window of time T2 to the GNN module 506, where the second window of time T2 begins after the first window of time T1 has ended. The GNN module 506 generates a prediction of one or more network performance parameters of the second subnetwork 804 and provides the prediction to the monitoring module 508. In some such embodiments, the monitoring module 508 then receives actual monitored data from the knowledge base 510 for the second subnetwork 804 and compares it to predicted data from the GNN module 506. In some such embodiments, the monitoring module 508 determines whether an anomaly is present based on this comparison. In some embodiments, if the monitoring module 508 detects an anomaly, the monitoring module 508 notifies the reinforcement module 512 (shown in FIG. 5).

The knowledge base 510 provides data for a third subnetwork 806 during a third window of time T3 to the GNN module 506, where the third window of time T3 begins after the second window of time T2 has ended. The GNN module 506 generates a prediction of one or more network performance parameters of the third subnetwork 806 and provides the prediction to the monitoring module 508. In some such embodiments, the monitoring module 508 then receives actual monitored data from the knowledge base 510 for the third subnetwork 806 and compares it to predicted data from the GNN module 506. In some such embodiments, the monitoring module 508 determines whether an anomaly is present based on this comparison. In some embodiments, if the monitoring module 508 detects an anomaly, the monitoring module 508 notifies the reinforcement module 512 (shown in FIG. 5).

Figure 9:
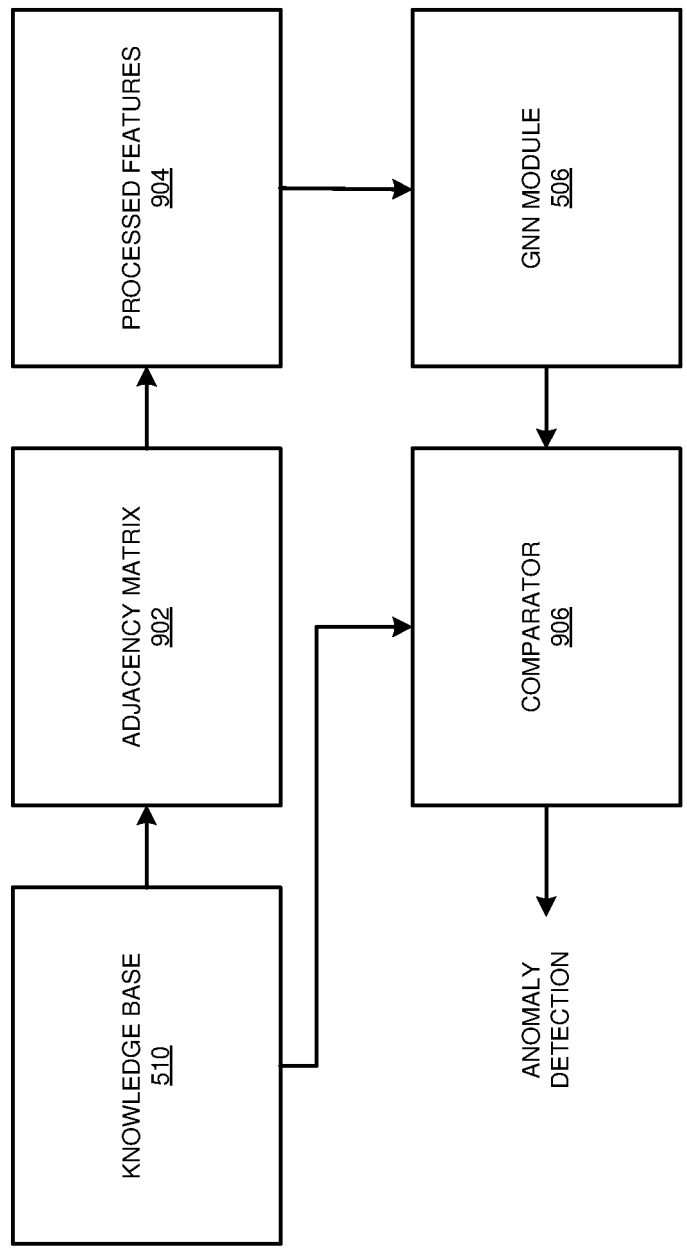
FIG. 9 depicts a block diagram of an exemplary monitoring process in accordance with an illustrative embodiment.

With reference to FIG. 9, this figure depicts a block diagram of an exemplary monitoring process in accordance with an illustrative embodiment. In the illustrated embodiment, the knowledge base 510 stores metadata and other data representative of aspects of the network 206 of FIG. 2.

In the illustrated embodiment, the knowledge base 510 provides data for the network 206 (or for a subnetwork of the network 206) to the GNN module 506. The provided data includes an adjacency matrix 902 and processed features 904. The adjacency matrix 902 provides an indication as to whether two nodes of the graph of the network 206 are connected. In some embodiments, the adjacency matrix 902 is a binary matrix that says if two nodes are connected or not. In some embodiments, the processed features 904 include a feature vector of input values to each of the nodes of the network 206 (or of a subnetwork of the network 206) and the GNN will be predicting the outputs of the nodes.

The GNN module 506 outputs the prediction to a comparator 906. In some embodiments, the comparator 906 is an example of the monitoring module 508. In some embodiments, the comparator 906 also receives actual monitored data from the knowledge base 510 and compares it to predicted data from the GNN module 506. In some such embodiments, the comparator 906 determines whether an anomaly is present based on this comparison. In some embodiments, if the comparator 906 detects an anomaly, the comparator 906 notifies the reinforcement module 512 (shown in FIG. 5).

Figure 10:
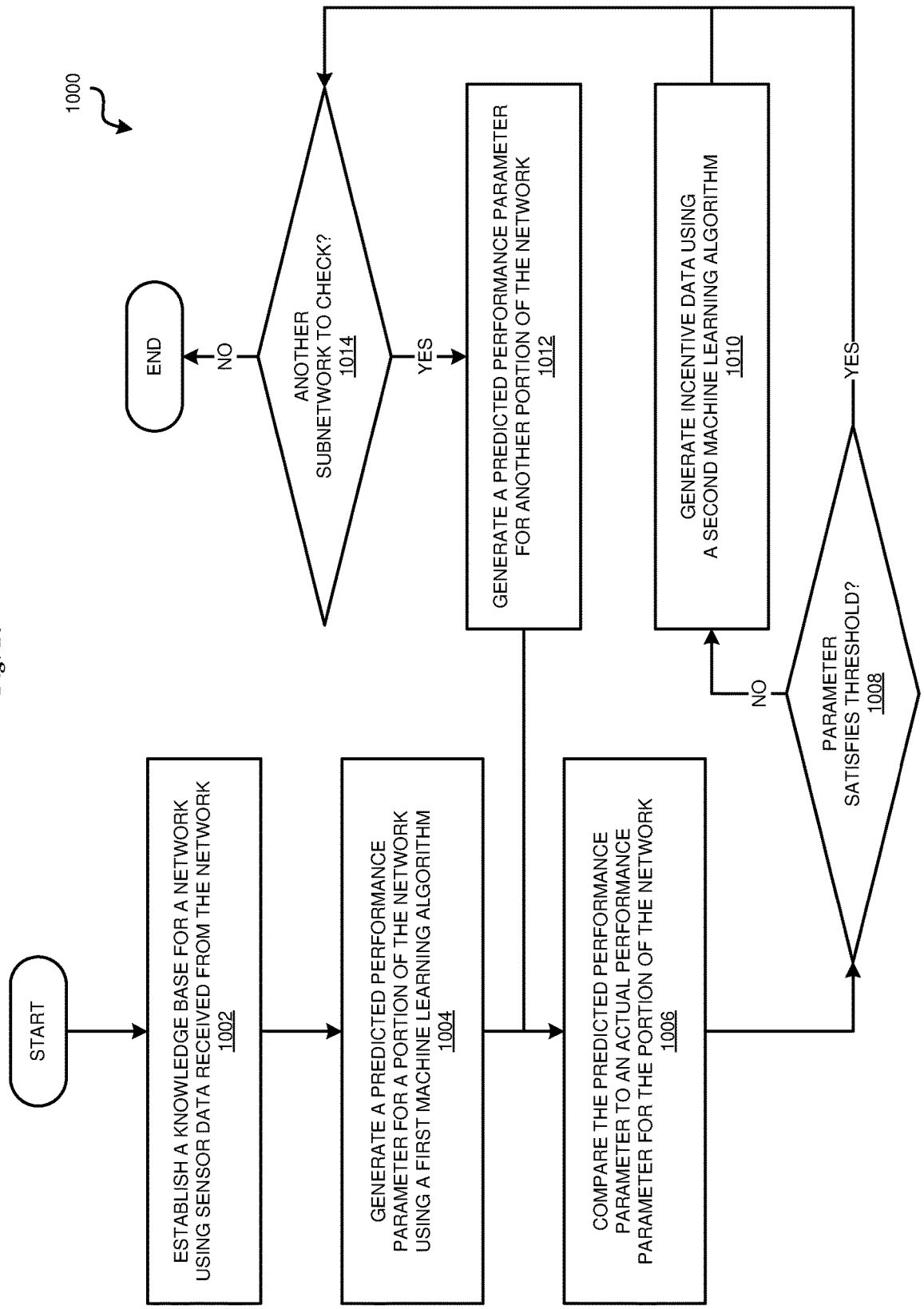
FIG. 10 depicts a flowchart of an example process for automated detection of network anomalies and generation of optimized anomaly-alleviating incentives in accordance with an illustrative embodiment.

With reference to FIG. 10, this figure depicts a flowchart of an example process 1000 for automated detection of network anomalies and generation of optimized anomaly-alleviating incentives in accordance with an illustrative embodiment. In a particular embodiment, the network management module 200 of FIGS. 1-4 or network management module 500 of FIG. 5 carries out the process 1000.

In the illustrated embodiment, at block 1002, the process establishes a knowledge base for a network using sensor data received from the network. Next, at block 1004, the process generates a predicted performance parameter for a portion of the network using a first machine learning model. In some embodiments, the first machine learning model is a GNN. Next, at block 1006, the process compares the predicted performance parameter to an actual performance parameter for the portion of the network.

Next, at block 1008, the process determines if the actual parameter value is within a threshold distance from the predicted value. If so, then the process proceeds to block 1014; otherwise, the process proceeds to block 1010.

At block 1010, the process generates incentive data using a second machine learning algorithm. In some embodiments, the incentive data is representative of an action selected by the second machine learning algorithm using an iterative optimization process. In some embodiments, the iterative optimization process comprises performing a series of actions and evaluating how each action affects the performance parameter. In some embodiments, the iterative optimization process is performed using a reinforcement learning algorithm.

Next, at block 1014, the process determines if there is another subnetwork to analyze. If so, the process continues to block 1012, where the process generates a predicted performance parameter for another portion of the network. Otherwise, the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   establishing a knowledge base based at least in part on sensor data received from a network, wherein the knowledge base comprises network data representative of a plurality of entities in the network and relationships among the plurality of entities in the network;
   generating a predicted performance parameter for a designated entity from the plurality of entities using a graph neural network;
   monitoring actual performance of the designated entity, wherein the monitoring the actual performance of the designated entity comprises receiving network data via one or more sensors coupled to the designated entity;
   generating an actual performance parameter based at least in part on the network data received via the one or more sensors coupled to the designated entity;
   comparing the predicted performance parameter to the actual performance parameter for the designated entity;
   determining that the actual performance parameter exceeds a threshold difference from the predicted performance parameter; and
   generating, responsive to determining that the actual performance parameter exceeds the threshold difference from the predicted performance parameter, an incentive program [Waal] using a reinforcement learning algorithm, wherein the incentive program comprises at least one action to perform to reduce electrical power usage and at least one of a monetary incentive and a non-monetary incentive to perform the at least one action;
   transmitting the incentive program to a user device of a user utilizing the designated entity; and
   optimizing the incentive program generated by the reinforcement learning algorithm via an iterative optimization process,
   wherein the iterative optimization process comprises determining whether the at least one action to reduce electrical power usage is performed and the actual performance parameter approaches the threshold difference, and
   upon a determination that the at least one action to reduce electrical power usage is performed and the actual performance parameter approaches the threshold difference, generating a second incentive program using the reinforcement learning algorithm similar to the incentive program previously generated to transmit at a subsequent iteration.

2. The computer-implemented method of claim 1, further comprising training the graph neural network to predict an output of the designated entity based at least in part on an input to the designated entity.

3. The computer-implemented method of claim 2, further comprising generating an adjacency matrix as an input for the graph neural network.

4. The computer-implemented method of claim 2 wherein the graph neural network predicts the output of the designated entity based at least in part on input from the knowledge base to the graph neural network.

5. The computer-implemented method of claim 4, further comprising providing the actual performance parameter from the knowledge base for comparison with the predicted performance parameter from the graph neural network.

6. The computer-implemented method of claim 1, wherein the reinforcement learning algorithm performs a series of actions and evaluates how each action affects the actual performance parameter.

7. A computer program product comprising one or more computer readable storage media, and program instructions collectively stored on the one or more computer readable storage media, the program instructions executable by a processor to cause the processor to perform operations comprising:
   establishing a knowledge base based at least in part on sensor data received from a network, wherein the knowledge base comprises network data representative of a plurality of entities in the network and relationships among the plurality of entities in the network;
   generating a predicted performance parameter for a designated entity from the plurality of entities using a graph neural network;
   monitoring actual performance of the designated entity, wherein the monitoring the actual performance of the designated entity comprises receiving network data via one or more sensors coupled to the designated entity;
   generating an actual performance parameter based at least in part on the network data received via the one or more sensors coupled to the designated entity;
   comparing the predicted performance parameter to the actual performance parameter for the designated entity;
   determining that the actual performance parameter exceeds a threshold difference from the predicted performance parameter; and
   generating, responsive to determining that the actual performance parameter exceeds the threshold difference from the predicted performance parameter, an incentive program using a reinforcement learning algorithm, wherein the incentive program comprises at least one action to perform to reduce electrical power usage and at least one of a monetary incentive and a non-monetary incentive to perform the at least one action;
   transmitting the incentive program to a user device of a user utilizing the designated entity; and optimizing the incentive program generated by the reinforcement learning algorithm via an iterative optimization process,
wherein the iterative optimization process comprises determining whether the at least one action to reduce electrical power usage is performed and the actual performance parameter approaches the threshold difference, and
upon a determination that the at least one action to reduce electrical power usage is performed and the actual performance parameter approaches the threshold difference, generating a second incentive program using the reinforcement learning algorithm similar to the incentive program previously generated to transmit at a subsequent iteration.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

10. The computer program product claim 7, further comprising training the graph neural network to predict an output of the designated entity based at least in part on an input to the designated entity.

11. The computer program product claim 10, further comprising generating an adjacency matrix as an input for the graph neural network.

12. A computer system comprising a processor and one or more computer readable storage media, and program instructions collectively stored on the one or more computer readable storage media, the program instructions executable by the processor to cause the processor to perform operations comprising:
establishing a knowledge base based at least in part on sensor data received from a network, wherein the knowledge base comprises network data representative of a plurality of entities in the network and relationships among the plurality of entities in the network;
generating a predicted performance parameter for a designated entity from the plurality of entities using a graph neural network;
monitoring actual performance of the designated entity, wherein the monitoring the actual performance of the designated entity comprises receiving network data via one or more sensors coupled to the designated entity;
generating an actual performance parameter based at least in part on the network data received via the one or more sensors coupled to the designated entity;
comparing the predicted performance parameter to the actual performance parameter for the designated entity;
determining that the actual performance parameter exceeds a threshold difference from the predicted performance parameter; and
generating, responsive to determining that the actual performance parameter exceeds the threshold difference from the predicted performance parameter, an incentive program using a reinforcement learning algorithm, wherein the incentive program comprises at least one action to perform to reduce electrical power usage and at least one of a monetary incentive and a non-monetary incentive to perform the at least one action;
transmitting the incentive program to a user device of a user utilizing the designated entity; and
optimizing the incentive program generated by the reinforcement learning algorithm via an iterative optimization process,
wherein the iterative optimization process comprises determining whether the at least one action to reduce electrical power usage is performed and the actual performance parameter approaches the threshold difference, and
upon a determination that the at least one action to reduce electrical power usage is performed and the actual performance parameter approaches the threshold difference, generating a second incentive program using the reinforcement learning algorithm similar to the incentive program previously generated to transmit at a subsequent iteration.

13. The computer system of claim 12, further comprising training the graph neural network to predict an output of the designated entity based at least in part on an input to the designated entity.

* * * * *